United States Patent
Winterhalter

(10) Patent No.: US 7,866,889 B2
(45) Date of Patent: Jan. 11, 2011

(54) FLUID DYNAMIC BEARING SYSTEM

(75) Inventor: Olaf Winterhalter, Epfendorf (DE)

(73) Assignee: Minebea Co., Ltd., Nagano-ken (JP)

(*) Notice: Subject to any disclaimer, the term of this patent is extended or adjusted under 35 U.S.C. 154(b) by 618 days.

(21) Appl. No.: 11/701,133

(22) Filed: Feb. 1, 2007

(65) Prior Publication Data

US 2007/0183696 A1 Aug. 9, 2007

(30) Foreign Application Priority Data

Feb. 6, 2006 (DE) ................ 10 2006 005 601

(51) Int. Cl.
*F16C 32/06* (2006.01)
(52) U.S. Cl. ................ 384/107; 384/100
(58) Field of Classification Search .......... 384/100, 384/103, 107, 112–113, 123, 131; 193/35 R, 193/37; 464/131
See application file for complete search history.

(56) References Cited

U.S. PATENT DOCUMENTS

| | | | | |
|---|---|---|---|---|
| 2,621,987 | A * | 12/1952 | Augereau | 384/107 |
| 3,212,829 | A * | 10/1965 | Gross | 384/12 |
| 3,891,282 | A * | 6/1975 | Tuffias | 384/123 |
| 4,130,325 | A * | 12/1978 | Schultenkamper | 384/425 |
| 4,133,585 | A * | 1/1979 | Licht | 384/103 |
| 5,129,739 | A | 7/1992 | Asai | |
| 6,020,664 | A * | 2/2000 | Liu et al. | 310/90 |
| 6,315,452 | B1 * | 11/2001 | Titcomb | 384/114 |
| 6,439,774 | B1 * | 8/2002 | Knepper et al. | 384/110 |
| 6,702,091 | B2 * | 3/2004 | Nimmo et al. | 193/37 |
| 6,940,193 | B2 * | 9/2005 | Hoffmann et al. | 310/67 R |
| 6,980,393 | B2 * | 12/2005 | Kull | 360/99.08 |
| 2003/0197975 | A1 * | 10/2003 | Kull | 360/99.08 |
| 2004/0020358 | A1 * | 2/2004 | Siegel et al. | 92/72 |
| 2004/0108780 | A1 | 6/2004 | Hoffmann | |
| 2004/0258335 | A1 * | 12/2004 | Shimizu et al. | 384/100 |
| 2005/0106015 | A1 * | 5/2005 | Osgood | 415/216.1 |
| 2006/0056751 | A1 * | 3/2006 | Engesser et al. | 384/100 |
| 2006/0078240 | A1 * | 4/2006 | Braun | 384/107 |

FOREIGN PATENT DOCUMENTS

| | | |
|---|---|---|
| DE | 2330671 | 1/1975 |
| DE | 19746771 | 4/1999 |
| DE | 200218821 | 3/2003 |
| DE | 102004044195 | 3/2006 |
| GB | 1077142 | 7/1967 |
| GB | 1337621 | 11/1973 |
| GB | 1577738 | 10/1980 |
| JP | 56049646 A * | 5/1981 |
| JP | 01150018 A * | 6/1989 |

(Continued)

*Primary Examiner*—Marcus Charles
(74) *Attorney, Agent, or Firm*—Cooper & Dunham LLP

(57) ABSTRACT

A fluid dynamic bearing system used particularly for a spindle motor having a shaft that is accommodated in a bearing bush and rotatably supported with respect to the bearing bush, a bearing gap filled with a bearing fluid being located between the shaft and the bearing bush. At least the outside circumference of a section of the shaft extending into the bearing bush is made of a plastic material. As an alternative, a film made of a plastic material whose thickness is less than the width of the bearing gap can be disposed in the bearing gap.

10 Claims, 4 Drawing Sheets

FOREIGN PATENT DOCUMENTS

| | | | | |
|---|---|---|---|---|
| JP | 01224518 A | * | 9/1989 | |
| JP | 09042277 | | 2/1997 | |
| JP | 10238488 A | * | 9/1998 | |
| JP | 2000253619 A | * | 9/2000 | |
| JP | 2001336524 | | 12/2001 | |
| JP | 2003154416 A | * | 5/2003 | |
| WO | WO-2005-028885 | | 3/2005 | |

* cited by examiner

FLUID DYNAMIC BEARING SYSTEM

BACKGROUND OF THE INVENTION

The invention relates to a fluid dynamic bearing system used particularly to rotatably support a spindle motor as employed, for example, to drive hard disk drives.

Prior Art

Spindle motors substantially consist of a stator, a rotor and at least one bearing system arranged between these two parts. The electrically driven rotor is rotatably supported with respect to the stator by means of the bearing system. Fluid dynamic bearings are frequently employed as the bearing system.

DE 202 18 821 U1 reveals a typical fluid dynamic bearing system for spindle motors that comprises a bearing bush and a shaft which is disposed in an axial bore in the bearing bush. The shaft rotates freely in the bearing bush, the two parts together forming a radial bearing whose surfaces are spaced apart from each other by a thin, concentric bearing gap filled with a lubricant.

Axial displacement of the shaft along the rotational axis is prevented by appropriately designed fluid dynamic thrust bearings. These kinds of thrust bearings are frequently formed by the two end faces of a thrust plate arranged at one end of the shaft, each end face being associated with a corresponding end face of the bearing bush and an inner end face of a cover plate. The cover plate forms a counter bearing to the thrust plate and seals the entire bearing system from below.

The components of the bearing system are generally made of steel, aluminum or sintered metals and are connected to each other by pressing, welding or bonding. The material and assembly costs are thus relatively high.

SUMMARY OF THE INVENTION

It is the object of the invention to provide a fluid dynamic bearing system for use in a spindle motor that can be built and assembled at significantly lower cost.

It is further the object of the invention to provide a bearing that is operable over a very wide temperature range.

This object has been achieved by the fluid dynamic bearing system according to the invention comprising a shaft that is accommodated in a bearing bush and rotatably supported with respect to the bearing bush, a bearing gap filled with bearing oil being located between the shaft and the bearing bush, and by at least the outside circumference of a section of the shaft extending into the bearing bush being made of a plastic material or sheathed with plastics.

Other advantageous characteristics can be derived from the embodiments disclosed below.

According to a first embodiment of the invention the shaft is made of metal and is sheathed in plastics at least along a section extending into the bearing bush. Due to the metal core, the shaft in this embodiment has a correspondingly high elasticity module and favorable stiffness values.

In another embodiment of the invention, however, the shaft can be made entirely of a plastic material, although the stiffness and elasticity module are somewhat less favorable compared to a shaft having a metal core.

The fluid dynamic bearing has a bearing gap that separates the outside circumference of the section of the shaft made of the plastic material and the inside circumference of the bearing bush from each other. The fact that the outside surface of the shaft in the said section of the shaft is made of plastics brings about the advantage and desirable effect that the plastic material expands or contracts quite substantially when the surrounding temperature changes, which means that the width of the bearing gap depends on the surrounding temperature and that it changes with the temperature.

In a further embodiment of the invention, a film made of a plastic material whose thickness is less than the width of the bearing gap can be disposed in the bearing gap. This embodiment likewise provides the effect of a bearing gap width dependent on the temperature.

Fluid dynamic slide bearings for spindle motors are generally filled with a bearing oil whose viscosity is highly temperature-dependent. At an assumed operating temperature range for a spindle motor of between −10° Celsius and +60° Celsius, the viscosity of the bearing oil changes by an approximate factor of 8 to 10, this means that at a temperature of −10° Celsius, viscosity is 8 to 10 times greater than at a temperature of +60° Celsius. As a rule, the width of the bearing gap in which the bearing oil is located is determined by the design and construction of the bearing and lies in the approximate range of 10 µm to several 10 µm. The bearing components are generally made of metals which have a relatively low temperature expansion coefficient. Hence the width of the bearing gap hardly changes at all within the operating temperature range. Due to its high viscosity, the bearing oil generates considerably more frictional resistance in the bearing at low temperatures than at high temperatures. This goes to greatly increase the energy consumption of a spindle motor at low temperatures. At the same time, the bearing patterns disposed on the bearing surfaces generate a significantly lower hydrodynamic pumping action on the bearing fluid at a higher operating temperature and lower bearing oil viscosity, which has a negative influence on the bearing stiffness at high temperatures.

According to the invention, use is now made of the large temperature expansion coefficients of plastics in order to at least partly compensate the changes in the viscosity of the bearing fluid over the operating temperature range. According to the invention, the temperature expansion coefficient a of the plastic material of the shaft is chosen such that the temperature-dependent change in the width s of the bearing gap is geared to a temperature-dependent change in the viscosity η of the bearing fluid such that the relationship between the viscosity of the bearing fluid and the width of the bearing gap remains substantially constant. The internal frictional force of the bearing fluid $F_R$ in the bearing gap is directly proportional to the viscosity η of the bearing fluid and inversely proportional to the spacing s of the bearing surfaces adjoining the bearing gap, hence to the width of the bearing gap. Approximately:

$$F_R \propto \frac{\eta}{s}$$

If, for example, the viscosity of the bearing fluid in the operating temperature range changes by a factor of 8 to 10, the plastic material of the shaft can be so chosen that the width of the bearing gap in the operating temperature range also decreases by a factor of 8 to 10 due to the temperature expansion of the plastic material. As a result, the internal friction in the bearing fluid remains approximately constant and thus the properties of the bearing over the operating temperature range.

For a temperature change ΔT, plastic material of a given thickness $d_1$ experiences a temperature expansion of:

$$\Delta d = d_1 \alpha \Delta T$$

and hence an absolute temperature expansion of $$d_2 = d_1(1 + \alpha \Delta T)$$

As a further characteristic of the invention, a thrust plate can be disposed on the shaft in a conventional way, the thrust plate forming a thrust bearing together with suitable counter bearing surfaces. According to the invention, the outer surface of the thrust plate can also be enveloped with a plastic material or the thrust plate can be made entirely of plastics. Moreover, the thrust plate and the shaft can be made from a single plastic piece or from two separate parts that are joined together during assembly.

Alongside the cost advantage offered by manufacturing the shaft and the thrust plate out of plastics, there is the important advantage that the viscosity differences of the bearing fluid can be compensated by a change in width of the bearing gap brought about by the temperature expansion of the plastic material.

Further costs can be saved in the manufacture of the bearing by integrating the bearing patterns already in the plastic material of the shaft and/or the thrust plate.

In another embodiment of the invention provision can be made for the plastic sheath not to be applied directly to the surface of the shaft but for it to be inserted into the bearing gap and more or less float in the bearing gap. To this effect, a plastic film can be used, for example, whose thickness is less than the width of the bearing gap. The plastic film can be inserted into the bearing gap during assembly of the bearing and may be fixed to the shaft or the bearing bush. It could, however, remain floating in the bearing gap. When there is a change in the surrounding temperature, the thickness of the plastic film changes in the manner described above, so that the effective width of the bearing gap also changes, thus achieving the above-described advantages.

DESCRIPTION OF A PREFERRED
EMBODIMENT OF THE INVENTION

Figure 1A:
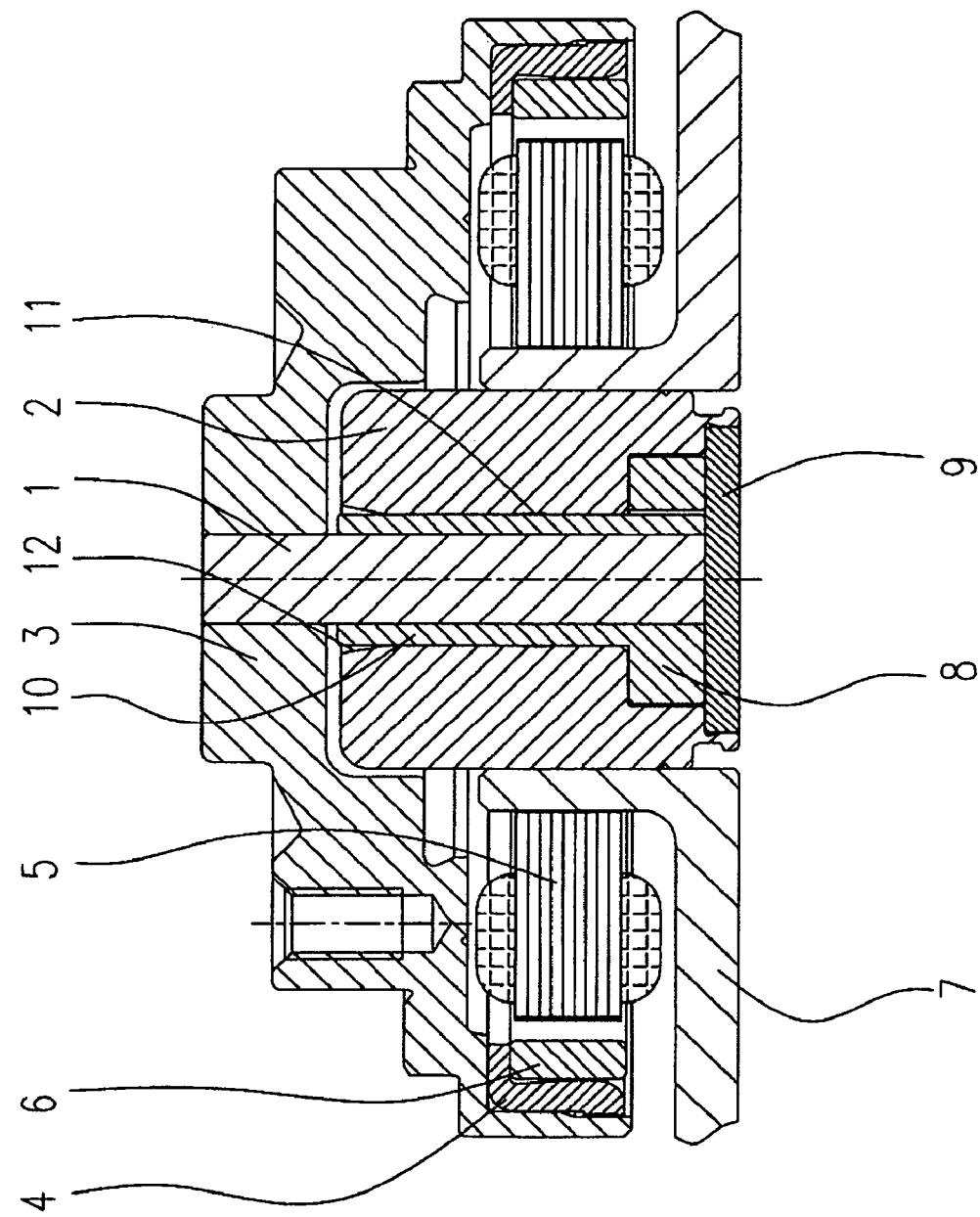
FIG. 1a shows a cross-section through a spindle motor having a fluid dynamic bearing system according to the new invention.
Figure 1B:
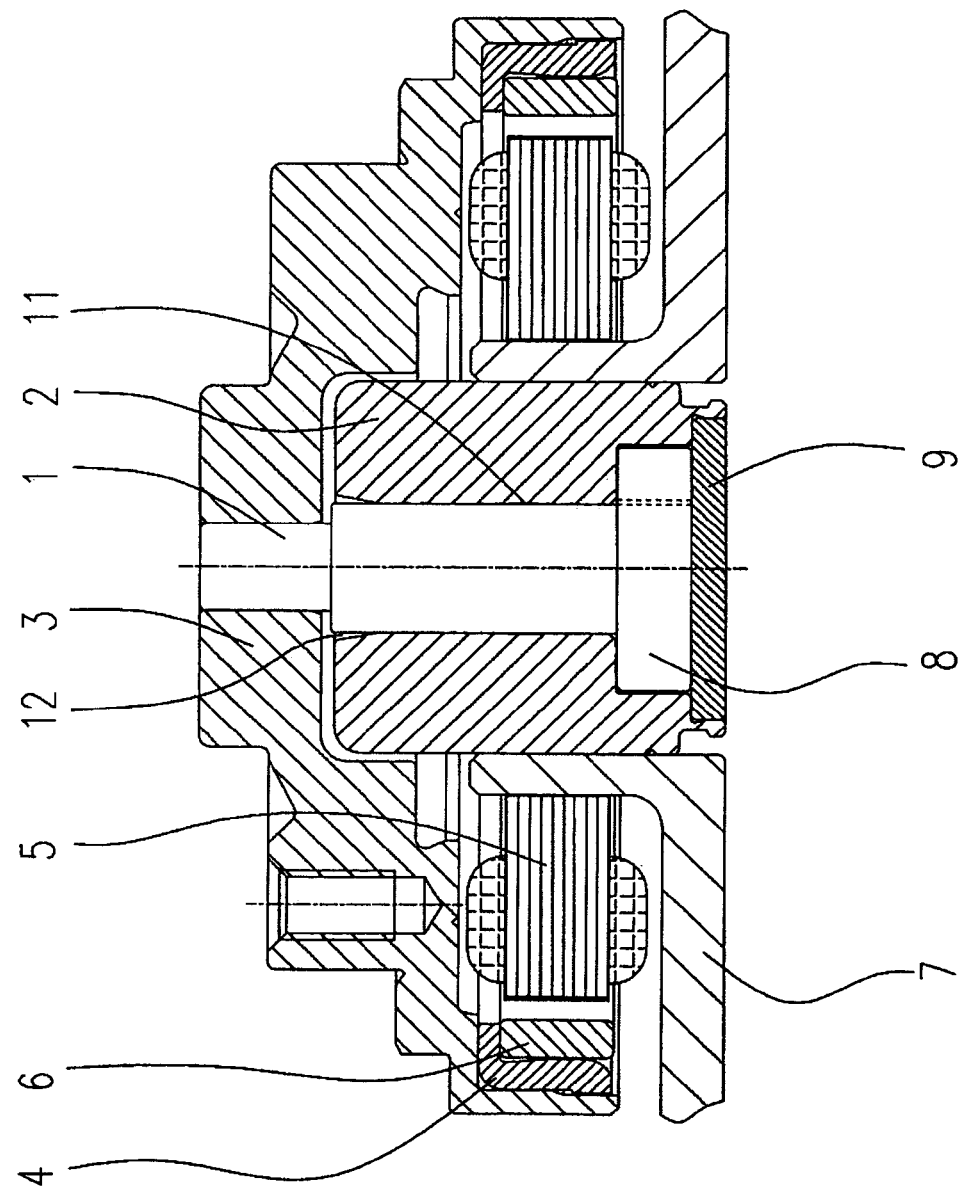
FIG. 1b shows a cross section through a spindle motor, except the shaft and cover plate of the spindle motor are not shown in cross section, the shaft and cover plate being formed of a single piece of plastic.

The spindle motor according to FIG. 1a, which can be used, for example, to drive a hard disk drive, comprises a stationary baseplate 7, on which a stator arrangement 5, made up of a stator core and windings, is arranged. A bearing bush 2 is held in a recess in the baseplate and has a cylindrical axial bore in which a shaft 1 is rotatably accommodated. The free end of the shaft 1 carries a hub 3 on which one or more storage disks (not illustrated) of the hard disk drive can be disposed and fixed. An annular permanent magnet 6 enclosed by a yoke 4 and having a plurality of pole pairs is disposed at the lower inside edge of the hub 3, an alternating electric field being applied to the pole pairs via a stator arrangement 5 spaced apart from them by means of an air gap, so that the hub 3 together with the shaft 1 is put into rotation. Power is supplied to the stator windings by means, for example, of an electrical connection. The shaft 1, together with the bearing bush 2 and a thrust plate 8 disposed at one end of the shaft 1, forms a fluid dynamic bearing system having radial bearing and axial bearing surfaces that are separated from each other by a bearing gap 11. The construction and function of this kind of fluid dynamic bearing system is known to a person skilled in the art and shall not be described in more detail here. The bearing arrangement is sealed from below, i.e. in the region of the thrust plate 8, by a cover plate 9.

According to the invention, the outside circumference of the section of the shaft 1 located in the bearing bush 2 is enveloped with a plastic material 10, a bearing gap 11 being formed between the outside circumference of the plastic material and the inside circumference of the bore of the bearing bush 2. The thickness d of the plastic material 10 and particularly its thermal expansion coefficient a is dimensioned such that the bearing gap at a normal operating temperature, such as +40° Celsius, has a width s that ensures optimum bearing properties with respect to frictional losses and stiffness. If the surrounding temperature falls, the viscosity of the bearing oil in the bearing gap 11 increases on the one hand, and on the other hand, the expansion of the plastic material 10 decreases and thus the overall thickness of the shaft 1, so that the width s of the bearing gap increases. Despite the higher viscosity of the bearing fluid, bearing losses are thereby reduced at low temperatures and an increase in bearing stiffness is counteracted.

Figure 2:
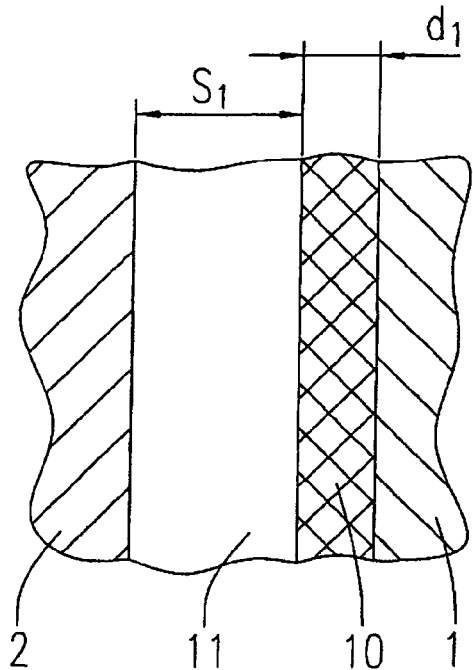
FIG. 2 shows an enlarged view of a region of the bearing gap at a low surrounding temperature.

As can be seen from FIG. 2, at low temperatures the bearing gap has a width $s_1$, since at low temperatures the plastic material 10 has a small width $d_1$.

Figure 3:
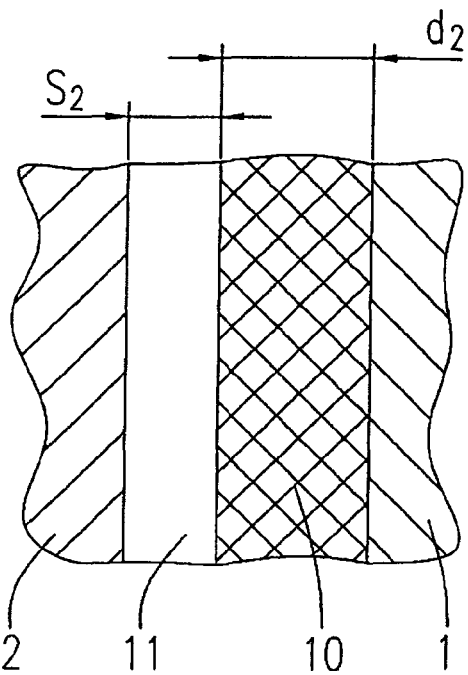
FIG. 3 shows an enlarged view of a region of the bearing gap at a high surrounding temperature.

At high temperatures, as shown in FIG. 3, on one hand the viscosity of the bearing fluid in the bearing gap 11 decreases but on the other hand the width $d_2$ of the plastic material increases, as a result of which the width $s_2$ of the bearing gap 11 decreases to the same extent, so that both the frictional resistance and the stiffness of the bearing remain approximately the same. This is brought about by the temperature expansion $\Delta T$ of the plastic sheath 10 at high temperatures. Below, the comparatively slight expansion of the metal core of the shaft 1 will be ignored.

Given:

$$d_2 = d_1(1 + \alpha \Delta T) \text{ and } s_1 + d_1 = s_2 + d_2$$

then:

$$s_2 = s_1(1 - d_1 \alpha \Delta T) \text{ or } s_1 - s_2 = d_1 \alpha \Delta T.$$

Since the metallic shaft core also expands to a lesser extent when there is a rise in temperature, the plastic sheath 10 is preferably shrunk on or bonded to the metal core of the shaft.

Figure 4:
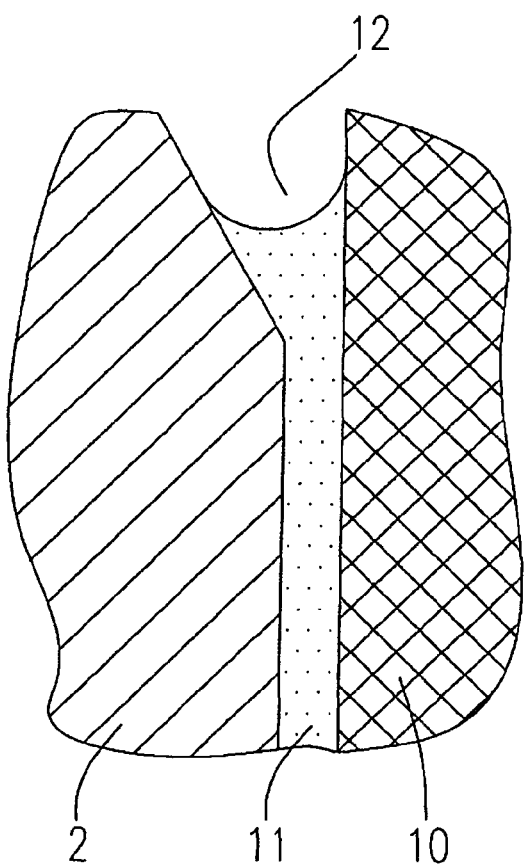
FIG. 4 shows an enlarged view of the bearing gap having a conical seal.

FIG. 4 shows an enlarged view of the bearing gap 11 in the region of its sealing, which is preferably effected here using a conical seal (capillary seal). By conically widening the bearing bush 2 or the plastic sheath 10 on the shaft 1 as well, a free space 12 is created which is used on the one hand as a conical seal and on the other hand as a reservoir for the bearing fluid. In selecting the plastic material for the plastic sheath 10, care can now be taken to choose a plastic material which ensures that a strong adhesive force is exerted on the bearing fluid, thus enabling capillary action to hold the bearing fluid as firmly as possible in the bearing gap 11 or in the reservoir 12 respectively. A longer useful life of the bearing and greater shock resistance can be achieved through the highest possible adhesive forces arrived at by choosing the appropriate plastic material.

Figure 5:
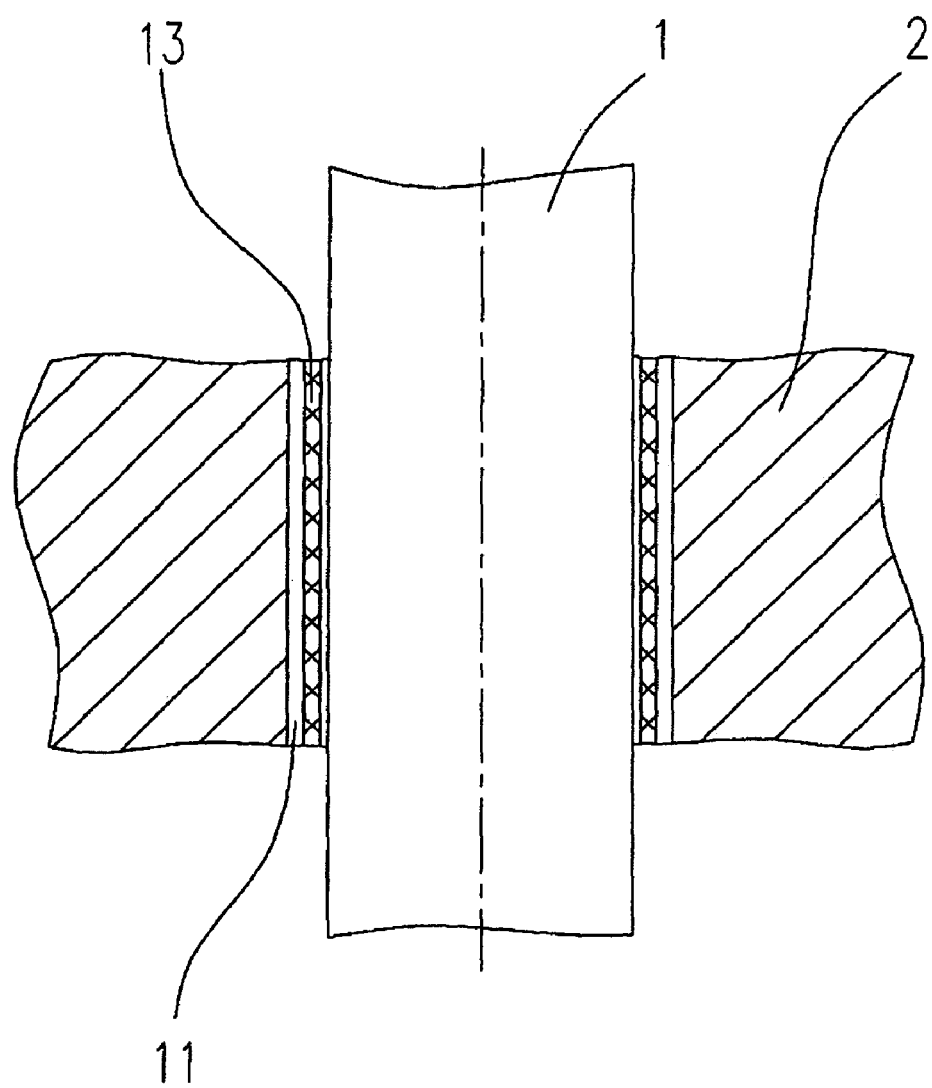
FIG. 5 schematically shows an embodiment of the invention having a plastic film inserted in the bearing gap.

FIG. 5 schematically shows an embodiment of the invention in which a plastic film 13 is inserted into the bearing gap 11 and floats in the gap. The thickness of the plastic film is considerably less than the width of the bearing gap. The plastic film 13 can be inserted into the bearing gap 11 when the bearing is being assembled and may be fixed to the shaft 1 or the bearing bush 2. However, it can also remain floating in the bearing gap 11. When the surrounding temperature changes, the thickness of the plastic film also changes in the manner described above, so that the effective width of the bearing gap likewise changes, thus achieving the above-described advantages.

| Identification Reference List | |
|---|---|
| 1 | Shaft |
| 2 | Bearing bush |
| 3 | Hub |
| 4 | Yoke |
| 5 | Stator arrangement |
| 6 | Magnet |
| 7 | Baseplate |
| 8 | Thrust plate |
| 9 | Cover plate |
| 10 | Plastic sheath |
| 11 | Bearing gap |
| 12 | Free space (conical) |
| 13 | Plastic film |

The invention claimed is:

1. A fluid dynamic bearing system having a shaft (1) that is accommodated in a bearing bush (2) and rotatably supported with respect to the bearing bush, a bearing gap (11) filled with a bearing fluid being located between the shaft and the bearing bush,
characterized in that,
at least the outside circumference of a section of the shaft (1) extending into the bearing bush is made of or sheathed with a plastic material (10), characterized in that the temperature-dependent change in the width of the plastic material (10) is geared to the temperature-dependent change in the viscosity of the bearing fluid such that the ratio of the viscosity of the bearing fluid to the width of the bearing gap remains substantially constant.

2. A fluid dynamic bearing system according to claim 1, characterized in that the shaft (1) is made entirely of a plastic material.

3. A fluid dynamic bearing system according to claim 1, characterized in that the temperature expansion coefficient of the plastic material (10) is chosen such that within the operating temperature range, the width of the bearing gap (11) changes by a given amount.

4. A fluid dynamic bearing system according to claim 3, characterized in that the temperature-dependent change in the width of the plastic material (10) is geared to the temperature-dependent change in the viscosity of the bearing fluid such that the internal frictional force of the bearing fluid remains substantially constant.

5. A fluid dynamic bearing system according to claim 1, characterized in that a thrust plate (8) is disposed on the shaft (1), at least the outside surface of the thrust plate being made of a plastic material.

6. A fluid dynamic bearing system according to claim 5, characterized in that the thrust plate (8) is made entirely of a plastic material.

7. A fluid dynamic bearing system according to claim 5, characterized in that the thrust plate (8) and the shaft (1) are made up of a single plastic piece.

8. A fluid dynamic bearing system according to claim 5, characterized in that bearing patterns (13) are integrated into the plastic material of the shaft (1) and/or of the thrust plate (8).

9. A fluid dynamic bearing system according to claim 1, characterized in that the fluid dynamic bearing system is configured for use in a spindle motor.

10. A fluid dynamic bearing system having a shaft (1) that is accommodated in a bearing bush (2) and rotatably supported with respect to the bearing bush, a bearing gap (11) filled with a bearing fluid being located between the shaft and the bearing bush, characterized in that, at least the outside circumference of a section of the shaft (1) extending into the bearing bush is made of or sheathed with a plastic material (10), characterized in that bearing patterns are integrated into the plastic material of the shaft, and further characterized in that the temperature-dependent change in the width of the plastic material (10) is geared to the temperature-dependent change in the viscosity of the bearing fluid such that the ratio of the viscosity of the bearing fluid to the width of the bearing gap remains substantially constant.

* * * * *